United States Patent
Zalmanski (10) Patent No.: US 12,086,537 B2
(45) Date of Patent: Sep. 10, 2024

(54) JOB FEED PARSER AND CONFIGURATOR

(71) Applicant: SAP SE, Walldorf (DE)

(72) Inventor: Olivier Zalmanski, Neuilly-Plaisance (FR)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 17/500,115

(22) Filed: Oct. 13, 2021

(65) Prior Publication Data

US 2023/0110030 A1 Apr. 13, 2023

(51) Int. Cl.
*G06F 40/154* (2020.01)
*G06N 3/045* (2023.01)

(52) U.S. Cl.
CPC ............ *G06F 40/154* (2020.01); *G06N 3/045* (2023.01)

(58) Field of Classification Search
CPC ............................... G06F 40/154; G06N 3/045
See application file for complete search history.

(56) References Cited

U.S. PATENT DOCUMENTS

| | | | |
|---|---|---|---|
| 2016/0117641 A1* | 4/2016 | Duer | G06Q 10/1053 705/321 |
| 2020/0065770 A1* | 2/2020 | Janapareddy | G06F 40/174 |

\* cited by examiner

*Primary Examiner* — Sonia L Gay
(74) *Attorney, Agent, or Firm* — Buckley, Maschoff & Talwalkar LLC (57) ABSTRACT

Systems include reception of a plurality of tags associated with a first job board and, for each of the plurality of tags, one or more values associated with the first job board, input of each of the plurality of tags to a first neural network to determine a field of a job posting system associated with the tag, wherein the first neural network is trained based on a plurality of mappings from fields of the job posting system to tags associated with a plurality of job boards, input of each of the one or more values of each of the plurality of tags to a second neural network to determine an item of the job posting system associated with the value, wherein the second neural network is trained based on a plurality of mappings from items of the job posting system to values associated with the plurality of job boards, creation of first mappings from each of the plurality of tags associated with the first job board to the determined field associated with the tag, creation of second mappings from each of the one or more values of each of the plurality of tags to the determined item associated with the value, and storage of the first mappings and the second mappings in association with the first job board.

17 Claims, 11 Drawing Sheets

FIG. 1

| Field (Item(s)) |
|---|
| Job Operation |
| Job Reference |
| Job title |
| Contract Type (Permanent Contract, Fixed-Term Contract, Internshhip) |
| Education level (Secondary, Undergraduate, Graduate, Doctorate, Post-Doctorate) |

| HTTP POST Request | | | |
|---|---|---|---|
| Tags | Possible values | Labels | Mandatory |
| id | *Free text* (max 10 characters) | | Yes |
| action | CREATE EDIT DELETE | | Yes |
| job_title | *Free text* (max 50 characters) | | Yes |
| contract_type | TEMP PERM | Temporary Permanent | Yes |
| diploma | 0 1 2 | High School Bachelor Doctor | No |

| Field | Tag |
|---|---|
| Job reference | id |
| Job operation | action |
| Job Title | job_title |
| Contract Type | contract_type |
| Education level | diploma |

1010

| Field : Item | Value |
|---|---|
| Contract Type : Permanent Contract | PERM |
| Contract Type : Fixed-Term Contract | TEMP |
| Contract Type : Internship | TEMP |
| Education level : N/A | *null* |
| Education level : Secondary | 0 |
| Education level : Undergraduate | 1 |
| Education level : Graduate | 1 |
| Education level : Doctorate | 2 |
| Education level : Post-Doctorate | 2 |

| Complete Post Fields | |
|---|---|
| Contract Type | Education Level |
| ☐ Permanent Contract | ☐ N/A |
| ☐ Fixed-Term Contract | ☐ Secondary |
| ☐ Internship | ☐ Undergraduate |
| | ☐ Graduate |
| 1310 | ☐ Doctorate |
| [Send Posting] | ☐ Post-Doctorate |

JOB FEED PARSER AND CONFIGURATOR

BACKGROUND

Modern software applications enable efficient execution of tasks. Such tasks may include generation and storage of data records, and transmission of those data records to other applications or services. For example, a user may operate an application to create a record, to select one or more websites, and to transmit the record to the one or more selected websites. Each of the selected websites may be configured to receive data records in a particular format, and therefore, prior to transmission of the record to the one or more selected websites, the application must first convert the data record to each of the respective formats.

In one example, a job posting application may include modules which enable a user to create a job posting consisting of fields (e.g., Skills, Education, Contract Type), and, for each field, one or more associated items (e.g., (C++, Python), (Bachelor's Degree), (Temporary)). The user may also select multiple third-party job posting platforms (i.e., job boards) to which the job posting should be transmitted. However, the fields and/or items used by one or more selected job boards might differ from the fields and/or item used by the recruiting application. Accordingly, the fields/items of the job posting must be mapped to corresponding (if any) fields/items (hereinafter referred to as tags/values) of the selected job boards prior to transmission thereto.

Typically, configuration of such mappings includes multiple stakeholders and manual actions and consumes an unacceptable amount of time and resources. For example, configuration may be initiated in response to a user request to integrate a new job board with the job posting application. A provider of the job posting application prioritizes the request within a queue and, once the request rises to the top of the queue, the provider discusses technical specifications with employees of the job board. After agreement on the technical specifications is reached, development activities which are required to configure the job posting application based on the technical specifications are queued based on priority. The resulting configuration must then be tested by the provider of the job posting application and validated by the job board, and the thusly-configured application is placed into production if testing and validation are successful. The above process is repeated for each job board to be integrated with the job posting application.

Attempts to address the foregoing include semi-automated tools which receive a sample job posting for a particular job board in extended Markup Language (XML) format, parse the job posting to create a proposed mapping between fields/items and tags/values, and allow a user to review and edit the proposed mapping. Such tools require technical skill on behalf of the user and are unsuitably time-consuming. Moreover, the tools are not usable for other common job posting formats such as JavaScript Object Notation (JSON) or comma-separated values (.csv).

Systems are desired to efficiently map fields/items used by a job posting application to corresponding tags/values defined by multiple heterogeneous job boards.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to systems which facilitate integration between an application and heterogeneous external platforms (e.g., websites, portals, data aggregators). According to some embodiments, mappings between posting system fields and job board tags and mappings between posting system items and job board values are efficiently determined. Such determination may be initiated, in some embodiments, by copying and pasting a job board specification table and/or or job feed samples (in XML, JSON, or .csv format) into a job posting application. Some embodiments employ machine learning to determine mappings based on stored job board profiles associated with already-integrated job boards. Embodiments may therefore conserve development and management resources while speeding the integration between a job posting application and job boards.

Figure 1:
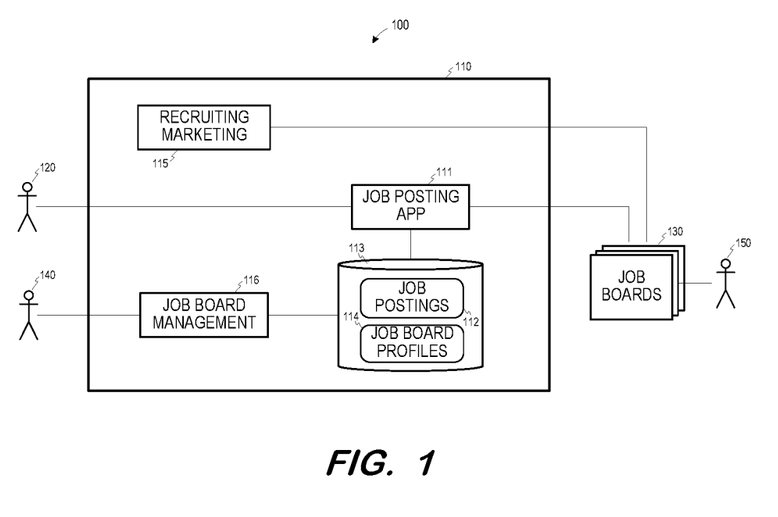
FIG. 1 is a block diagram of an architecture including a recruiting application and a plurality of job boards integrated therewith according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/ or any other metric.

Application platform 110 may comprise an on-premise, cloud-based, or hybrid computing platform providing an execution platform and services to software applications. Application platform 110 may comprise one or more virtual machines executing program code of an application server. The software applications may comprise program code executable by one or more processing units (e.g., Central Processing Units (CPUs), processor cores, processor threads) of application platform 110 to provide various functions.

In one example, manager 120 operates job posting application 111 to create a job posting. Job posting application 111 may provide a portal which manager 120 accesses over the Web. Job posting application 111 may store the created job posting in job postings 112 of data store 113, and may also read, update and delete job postings therefrom. Data store 113 may comprise any suitable storage system such as a database system, which may be partially or fully remote from compute elements of platform 110, and may be distributed as is known in the art.

A job posting 112 created by job posting application 111 may specify fields (i.e., posting system fields) and, for each field, one or more items (i.e., posting system items). The fields and items describe attributes associated with the job to which the job posting 112 relates. The attributes may comprise qualifications, job type, job benefits, etc. For example, a job posting 112 may specify the field Skills and the associated items C++ and Python, the field Education and the associated items Bachelor's Degree and Graduate Degree, and the field Contract Type and the associated item Temporary. Embodiments may utilize any suitable fields and items.

Figure 2:
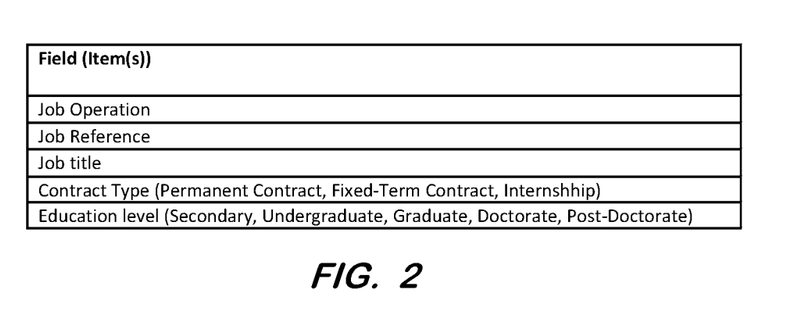
FIG. 2 is a tabular representation of fields and items of a recruiting application according to some embodiments.

In one example, FIG. 2 is a tabular representation of fields and associated items of a job posting application. The job posting application generates job postings including one or more of the illustrated fields and, for each of the one or more included fields, zero (if no items are associated with the field) or one or more items. Some of the fields may be mandatory to include in a job posting while others may be optionally included. The fields and items of FIG. 2 are provided for descriptive purposes only, and actual implementations are expected to include other fields and items.

Manager 120 may also operate job posting application 111 to select one or more of job boards 130 to receive a job posting 112. Each of job boards 130 may comprise an on-premise, cloud-based or hybrid computing system which may accept data from job posting application 111. Job posting application 111 transmits the job posting 112 to each selected job board 130 based on its corresponding job board profile 114.

Each job board profile 114 specifies technical and other details of its associated job board 130. The details included in a job board profile 114 may include a transmission protocol, data format (e.g., XML, JSON, .csv), a name, a logo, contact details, etc. associated with its corresponding job board 130. The details may also specify tags (i.e., job board tags) and associated values (i.e., job board values) and labels (i.e., job board labels) used by the corresponding job board 130.

Since the tags, values and labels in a job board profile 114 are used by a job board 130, a job posting 112 transmitted to the job board 130 should conform to the same tags, values and labels. However, the tags, values and labels used by a particular job board 130 might not be identical to the fields and items used by job posting application 111 to create the job posting. For example, a job board 130 may use the tag Diploma and the associated values 0, 1, 2 which indicate, respectively, the labels High School, Bachelor's and Doctorate. With reference to the above example, transmission of a job posting 112 including the field Education and associated items Bachelor's Degree and Graduate Degree to this job board 130 would therefore require converting the field Education to the tag Diploma and converting the items Bachelor's Degree and Graduate Degree to corresponding ones of values 0, 1, 2.

To facilitate the foregoing conversion, job board profiles 114 also provide, for a given job board 130, mappings from posting system fields to job board tags and mappings from posting system items to job board values. Since different job boards 130 may be associated with different job board tags and job board values, their corresponding job board profiles 114 may include different mappings to the same posting system fields and posting system items.

Figure 3:
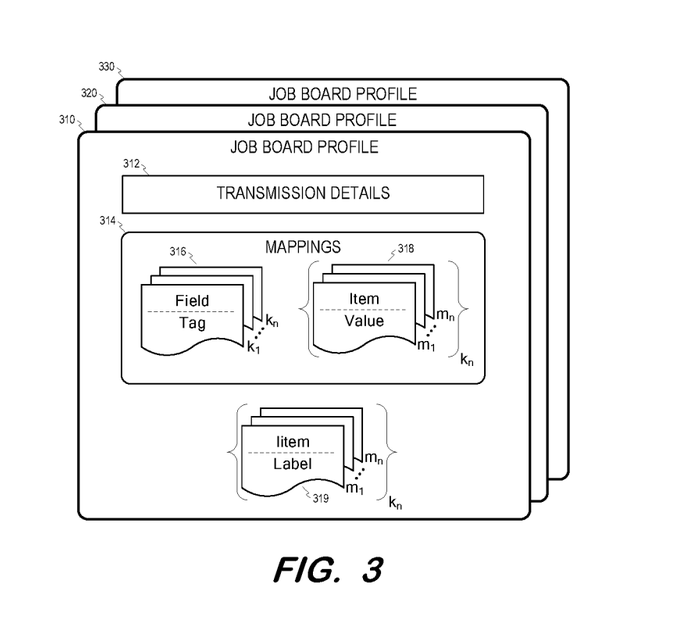
FIG. 3 depicts mappings and other data stored within job board profiles according to some embodiments.

FIG. 3 illustrates job board profiles 310, 320 and 330 corresponding to respective job boards 130 and used by a posting application 111 to transmit job postings 112 to the respective job boards 130. Taking job board profile 310 as a representative example, transmission details 312 include information describing the manner in which data is to be transmitted to the respective job board 130. This information may include a transmission protocol (e.g., HTTP POST (API)), a format (e.g., JSON) and any other suitable information. Mappings 314 include field-to-tag mappings 316 and item-to-value mappings 318. It is noted that a set of item-to-value mappings 318 exists for each field-to-tag mapping 316, in order to account for fields which may be associated with one or more identical items. A set of item-to-value mappings 318 associated with a given field may be empty in a case that the field is not associated with any items (e.g., Job Operation of FIG. 2).

Job profile 310 also includes a set of item-to-label mappings 319 for each item-to-value mapping 316. The item-to-label mappings 319 may be included if the associated job board 130 uses non-descriptive values (e.g., 0, 1, 2) for one or more fields, each of which is described by a corresponding labels (e.g., High School, Bachelor's, Doctorate). Such mappings 319 facilitate an administrator's understanding of mappings 318, may be used to substitute non-descriptive values with descriptive text in a user interface and, as will be described below, may be used to train a network to generate new item-to-value mappings.

Transmission of a job posting 112 to a job board 130 associated with job board profile 310 may therefore comprise mapping the fields and items of the job posting 112 to corresponding tags and values using mappings 314, and transmitting the mapped tags and values to the job board 130 based on transmission details 312. A same process is used to transmit the same job posting 112 to a job board 130 associated with job board profile 320, albeit using the mappings and transmission details of job board profile 320. Job board profiles 310, 320 and 330 therefore allow the creation of job postings using a common set of fields and items and the transmission of each of these job postings to multiple disparate job boards, each of which does not conform to the set of fields and items.

According to some embodiments, job postings 112 received by one of job boards 130 from job posting application 111 may be viewed by candidates such as candidate 150. Job boards 130 may communicate job postings to candidate 150 in any manner that is or becomes known. For example, candidate 150 may establish a subscription with a job board 130 to receive notices (e.g., via e-mail or text) of job postings which are associated with certain tag-value combinations (e.g., particular location, particular position, particular degree requirement). Candidate 150 may also directly access a job board 130, with or without login credentials, to browse job postings received thereby.

According to some embodiments, candidate 150 may respond to a job posting via a job board 130 on which the job posting resides. For example, a job board 130 may include a "Send resume and cover letter" hyperlink which candidate 150 may select to upload documents to recruiting marketing application 115 of platform 110. Recruiting marketing application 115 may be operated by manager 120 or other human resources personnel to facilitate the organization and review of communications received from candidates.

Administrator 140 may access job board management application 116 to generate a job board profile 114 associated with a job board to be added to job boards 130. Generation of a job board profile 114 includes generation of field-to-tag and item-to-value mappings associated with the tags and items of the job board to be added. A thusly-added job board 130 may be selected to receive a job posting 112 as described above.

Job board management application 116, recruiting marketing application 115 and job posting application 111 may comprise elements of a suite of applications provided by platform 110. Each application in the suite may communicate with other applications of the suite via respective Application Programming Interfaces (APIs). For example, a user may access a landing Web page of the suite of applications, provide credentials, and then be presented with an interface allowing selection of, depending on the credentials, one or more of the applications of the suite.

Figure 4:
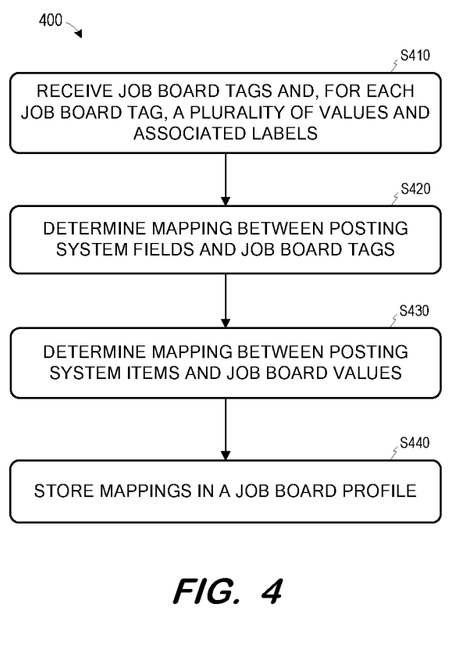
FIG. 4 comprises a flow diagram of a process to determine mappings between posting system fields and job board tags and between posting system items and job board values according to some embodiments.

FIG. 4 comprises a flow diagram of a process to determine mappings between posting system fields and job board tags and mappings between posting system items and job board values according to some embodiments.

Process 400 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Process 400 may be initiated by a request to add a job board profile of a given job board to a set of job board profiles so that the job posting application may transmit job postings to the given job board. Such a request may be submitted by an administrator of the job posting application via a job board management application as described above. Process 400 may therefore be executed by a job board management application in some embodiments.

Initially, at S410, information associated with a job board is received. The information includes job board tags used by the job board and, for each job board tag, zero or more associated job board values. The information received at S410 may also include job board labels associated with one or more of the job board values. As described above, in a case that the job board tag Diploma is associated with job board values 0, 1, 2, associated job board labels High School, Bachelor's, Doctorate may be received at S410.

The information may be received at S410 via any suitable means. In some embodiments, the information is received via copying sample job board feeds from documentation provided by the job board and pasting the feeds into corresponding user interface of a job board management application. The feeds may exhibit any suitable data format (e.g., XML, JSON, .csv).

Figure 5:
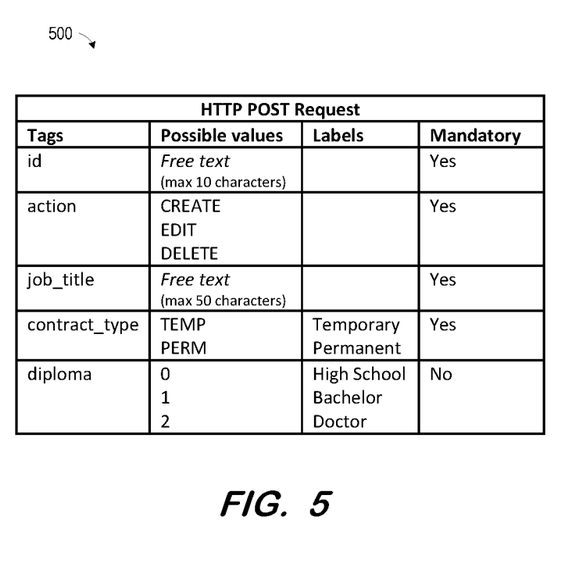
FIG. 5 is a tabular representation of associated tags, values and labels of a job board according to some embodiments.

The information may also or alternatively be received from a specification table of the job board documentation. FIG. 5 illustrates specification table 500 associated with a job board according to some embodiments. Specification table 500 includes a plurality of tags and, for each tag, a list of possible values. Some of the values (i.e., TEMP, PERM, 0, 1, 2) are associated with corresponding labels (i.e., Temporary, Permanent, High School, Bachelor, Doctor). Table 500 also specifies whether a particular tag must be included in a job posting sent to the job board. The tags, values, and labels of table 500 are provided for descriptive purposes only. An actual implementation is expected to include many more tags and associated values and labels.

Table 500 includes additional information which may be received at S410 according to some embodiments. This information includes a transmission protocol (i.e., HTTP POST) which should be used to send a job posting to the job board. Any other suitable information to facilitate communication with the job board may be received at S410.

A mapping between the fields of a posting system and the received job board tags is determined at S420. According to some embodiments, the mapping is determined at S420 using a neural network trained based on the mappings which currently exist within stored job board profiles of the posting system. The neural network may be trained prior to or during process 400.

Figure 6:
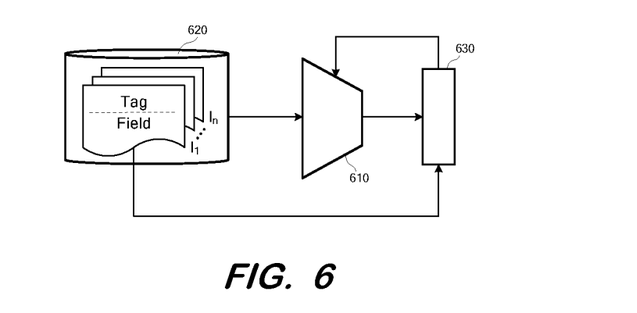
FIG. 6 depicts training of a neural network based on job board profile mappings to infer a posting system field from a job board tag according to some embodiments.

FIG. 6 depicts training of a neural network based on job board profile mappings to infer a posting system field from a job board tag according to some embodiments. Network 610, and all other neural networks described herein, may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Embodiments may comprise any one or more types of artificial neural network model that are or become known, including but not limited to convolutional neural network models, recurrent neural network models, long short-term memory network models, deep reservoir computing and deep echo state network models, deep belief network models, and deep stacking network models.

As is known in the art, the structure of network 610 is defined by hyperparameters and initial node weights. The hyperparameters and initial node weights are designed to receive a string (i.e., a tag) and output a string (i.e., a field). As shown in FIG. 6, network 610 is trained based on training data 620. According to some embodiments, training data 620 consists of data-ground truth pairs $l_1$ to $l_n$. Each of pairs $l_1$ to $l_n$ consists of a tag (i.e., the "data") and a field (the "ground truth").

Each of pairs $l_1$ to $l_n$ may be generated based on field-to-tag mappings of existing job board profiles corresponding to other job boards. For example, in a case that the job board is to be added to job boards 130 associated with posting application 111 of system 100, pairs $l_1$ to $l_n$ may be generated based on the field-to-tag mappings (e.g., field-to-tag mappings 316) of each stored job board profile 114. Specifically, each individual field-to-tag mapping corresponds to a single data-ground truth pair, where the tag of the mapping is the data and the field of the mapping is the ground truth.

As is known in the art, a minibatch (i.e., a subset) of pairs $l_1$ to $l_n$ is determined and the tags of the minibatch are input to network 610. Network 610 generates a field corresponding to each input tag and the generated fields are received by loss layer 630. Loss layer 630 determines a total loss based on a difference between each field generated by network 610 and the actual field associated with the input tag from which the field was generated. The total loss is back-propagated to network 610 in order to modify parameters of network 610 (e.g., using known stochastic gradient descent algorithms) in an attempt to minimize the total loss.

Network 610 is iteratively modified in the above manner, using a new minibatch at each iteration, until the total loss reaches acceptable levels or training otherwise terminates (e.g., due to time constraints or to the loss asymptotically approaching a lower bound). At this point, network 610 is considered trained. Some embodiments may evaluate a performance of network 610 based on testing data (e.g., a subset of pairs $l_1$ to $l_n$ which was not used to train network 610) and re-train network 610 differently (e.g., using different initialization, a different number of training steps, a different loss function, a different gradient descent implementation, etc.) if the performance is not satisfactory.

According to some embodiments, job board management application 116 performs the above-described training. Application platform 110 may provide services to job board management application 116 to facilitate the training. In some embodiments, job board management application 116 may call an external Web service which provides machine learning services to client applications.

Figure 7:
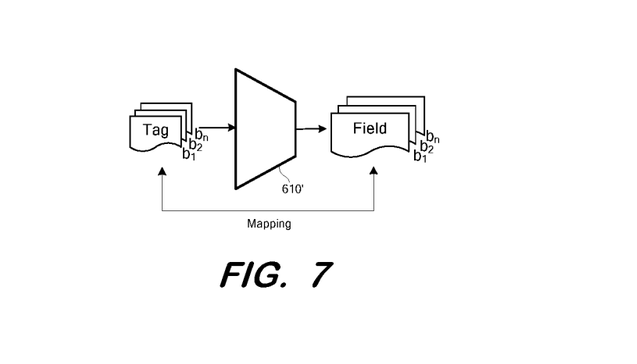
FIG. 7 depicts use of a trained neural network to determine mappings between posting system fields and job board tags according to some embodiments.

FIG. 7 depicts use of a trained neural network to determine mappings between posting system fields and job board tags at S420 according to some embodiments. FIG. 7 includes network 610', which is considered to be already trained based on existing field-to-tag mappings of the posting system as described above.

Each tag $b_1$ to $b_n$ of the job board, as received at S410, is input to trained network 610'. Network 610' operates as trained to generate corresponding fields $b_1$ to $b_n$. A mapping is then created which associates each respective field $b_1$ to $b_n$ with the tag $b_1$ to $b_n$ from which it was generated.

Next, at S430, a mapping between the items of a posting system and the received job board values is determined. The mapping may be determined at S430 using a neural network trained based on the item-to-value mappings which currently exist within stored job board profiles of the posting system. As described with respect to S420, this neural network may be trained prior to or during process 400.

Figure 8:
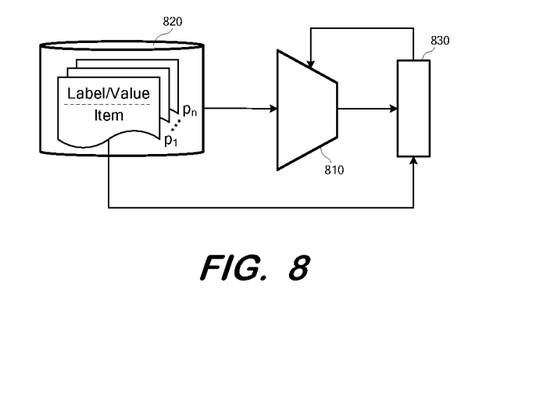
FIG. 8 depicts training of a neural network based on job board profile mappings to infer a posting system item from a job board label according to some embodiments.

FIG. 8 depicts training of neural network 810 based on job board profile mappings to infer a posting system item from a job board label according to some embodiments. The hyperparameters and initial node weights of network 810 are designed to receive a string (i.e., a label or a value) and output a string (i.e., an item). Training data 820 consists of data-ground truth pairs $p_1$ to $p_n$. Each of pairs $p_1$ to $p_n$ consists of a label or value (i.e., the "data") and an item (the "ground truth").

Similar to pairs $l_1$ to $l_n$, each of pairs $p_1$ to $p_n$ may be generated based on item-to-value mappings and item-to-label mappings of existing job board profiles corresponding to other job boards. In a case that the job board is to be added to job boards 130 associated with posting application 111 of system 100, pairs $p_1$ to $p_n$ may be generated based on the item-to-value mappings and item-to-label mappings (e.g., item-to-value mappings and item-to-label mappings) of each stored job board profile 114. In one example, for each job board profile, a data-ground truth pair is generated based on each item-to-value mapping if the value of the mapping is not associated with a label. If the value of the mapping is associated with a label (e.g., in a corresponding item-to-label mapping 319), the pair is generated based on the label and the item. The foregoing process addresses the lack of semantic information in some values (e.g., 0, 1, 2) associated with some job boards.

Network 810 may be trained based on training data 820 and using loss layer 830 as described above with respect to network 610. The training may be performed by job board management application 116, with or without the assistance of external machine learning services.

Figure 9:
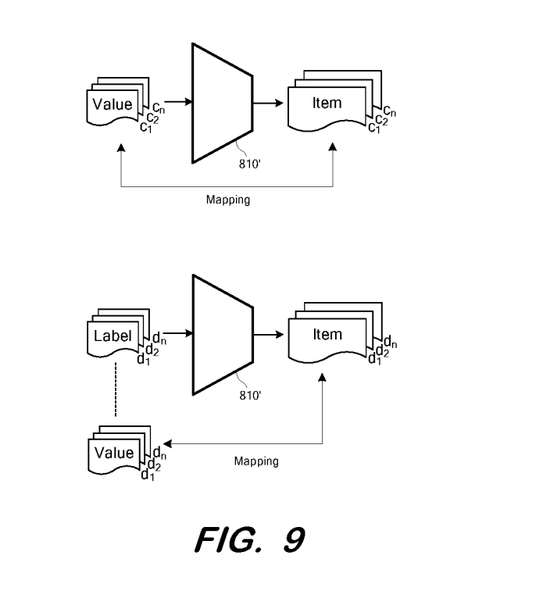
FIG. 9 depicts use of a trained neural network to determine mappings between posting system items and job board values according to some embodiments.

FIG. 9 depicts use of a trained neural network to determine mappings between posting system items and job board values at S230 according to some embodiments. FIG. 9 includes network 810', which is considered to be trained as described above.

FIG. 9 shows two scenarios, an upper scenario in which each value $c_1$ to $c_n$ of the job board, as received at S210, is input to trained network 810' to generate corresponding items $c_1$ to $c_n$. A mapping is then created which associates each respective item $c_i$ to $c_n$ with the value $c_1$ to $c_n$ from which it was generated.

The lower scenario is used for those values of the job board which are associated with a label received at S210, again under the assumption that such values lack sufficient semantic meaning. In such a scenario, each such label $d_1$ to $d_n$ is input to trained network 810' to generate corresponding items $d_1$ to $d_n$. As shown in FIG. 9, mapping is then created which associates each respective item $d_1$ to $d_n$ with the value $d_1$ to $d_n$ that is associated with the label $d_1$ to $d_n$ from which the item was generated.

The mappings determined at S420 and S430 are stored in a job board profile at S440. The mappings may be stored in any suitable format which facilitates conversion of a field and associated item specified in a job posting created by the job posting system to a tag and value of the job board from which the mappings were determined. Usage of such conversion according to some embodiments will be described below.

Figure 10:
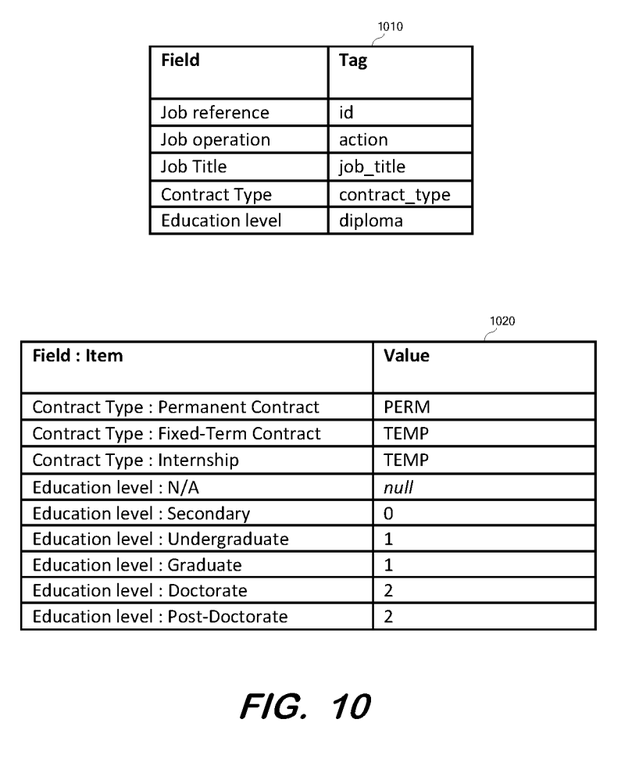
FIG. 10 depicts tabular representations of mappings between posting system fields and job board tags and mappings between posting system items and job board values according to some embodiments.

FIG. 10 depicts tabular representations of mappings between posting system fields and job board tags and mappings between posting system items and job board values according to some embodiments. Mappings 1010 map posting system fields to tags of the added job board. As described above, each field of mappings 1010 may have been output by a trained neural network in response to input of the tag to which it is mapped.

Similarly, mappings 1020 map posting system items to values of the added job board. Each field of mappings 1020 may have been output by a trained neural network in response to input of the value to which it is mapped. For those values lacking semantics, a trained network may have determined the corresponding items based on labels associated with the values, as illustrated in FIG. 9.

According to some embodiments, the mappings determined for the added job board may subsequently be used to re-train the associated neural network. For example, the mappings from posting system fields to tags of the added job board may be added to training data 620 to re-train network 610, and the mappings from posting system items to values of the added job board may be added to training data 820 to re-train network 810.

Figure 11:
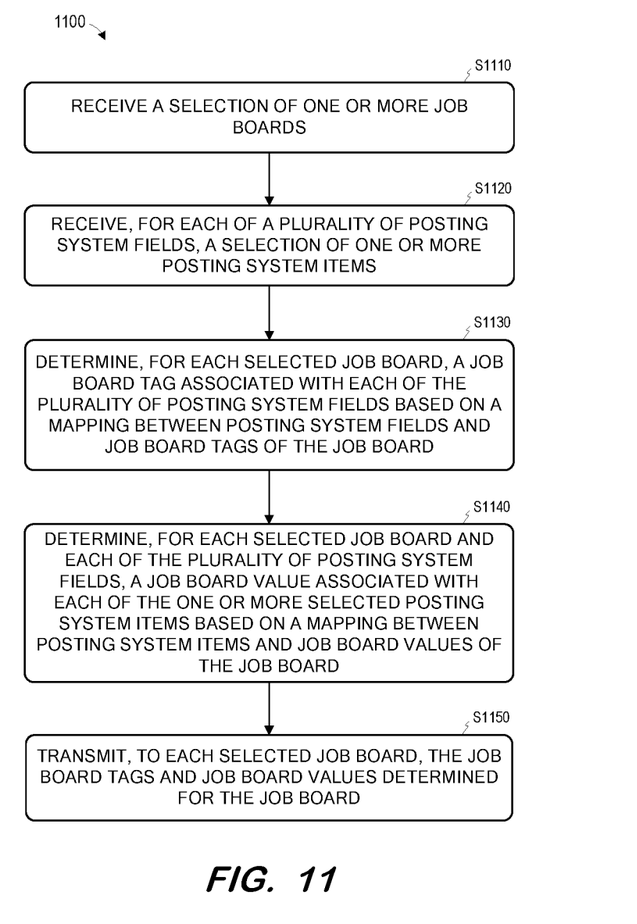
FIG. 11 comprises a flow diagram of a process to transmit a job posting to one or more selected job boards according to some embodiments.

FIG. 11 comprises a flow diagram of process 1100 to transmit a job posting to one or more selected job boards according to some embodiments. Process 1100 may be implemented by processor-executable program code of a job posting application.

It will be assumed that a user has initiated creation of a job posting prior to process 1100, perhaps by specifying a title or other initial information. Next, the user determines the job boards to which the posting should be transmitted.

Figure 12:
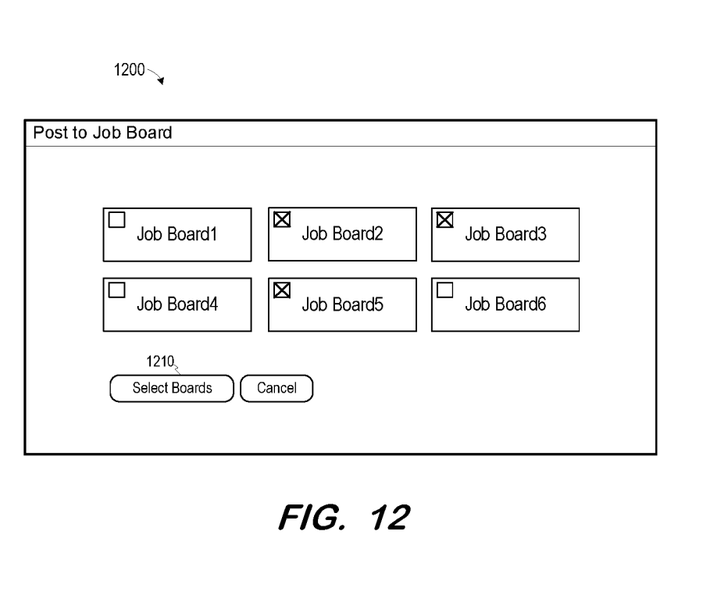
FIG. 12 is a view of a user interface to specify one or more job boards to which a job posting is to be transmitted according to some embodiments.

FIG. 12 is a view of user interface (UI) 1200 to specify one or more job boards to which a job posting is to be transmitted according to some embodiments. UI 1200 may be displayed on a computing device operated by manager 120 of FIG. 1. In particular, manager 120 may operate the computing device to access job posting application 111 executing on platform 110.

UI 1200 presents several job boards and associated checkboxes. The job boards may comprise job boards for which a corresponding job board profile 114 is stored in data store 113. As shown, the user has selected Job Board2, Job board3 and Job Board5 for reception of the job posting. The selection of the job boards is received at S1110 in response to user selection of Select Boards control 1210.

Figure 13:
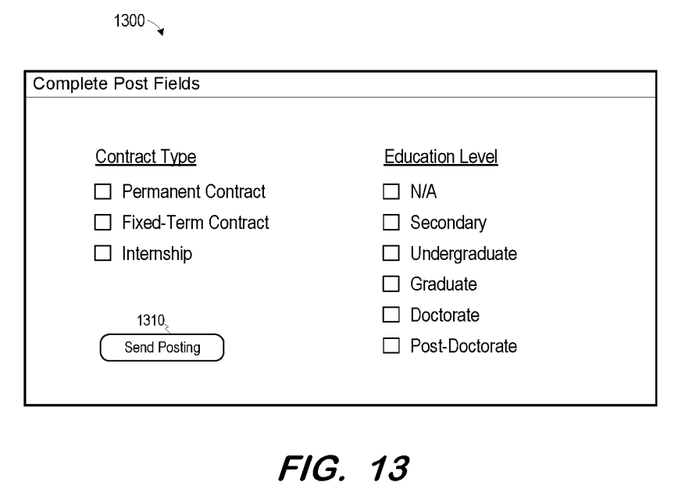
FIG. 13 is a view of a user interface for specifying fields and items of a job posting according to some embodiments.

In response to selection of the job boards, a selection of one or more posting system items is received for each of a plurality of posting system fields at S1120. FIG. 13 is a view of user interface 1300 for specifying fields and items of a job posting according to some embodiments. As shown, fields Contract Type and Education Level are each associated with a pick-list of items. The two displayed fields and associated items of user interface 1300 are provided for example purposes and a job posting will likely include several other fields and associated items. Once the items for the job posting have been specified, the user may select control 1310 to issue an instruction to transmit the job posting to the selected boards.

In response to the instruction, and for each of the selected job boards, a job board tag associated with each of the plurality of posting system fields is determined at S1130. S1130 may comprise identifying a job board profile 114 for each selected job board 130 and, using the field-to-tag mapping of the job board profile, mapping each of the plurality of posting system fields to a respective tag.

At S1140, and for each of the selected job boards and each of the plurality of fields of each job board, a job board value associated with each of the one or more selected posting system items is determined. The values are determined based on the job board-specific mappings between the posting system items and the job board values stored in each job board profile. Accordingly, after S1140, tags and values which correspond to the fields and items of the job posting are known for each selected job board.

At S1150, the job board tags and job board values determined for each job board are transmitted to the respective job boards. The tags and values may be formatted into a data structure (e.g., an XML feed) defined by a corresponding board profile, and the data structure may be transmitted using a data transfer protocol which is also defined in the corresponding board profile. This process is repeated, successively or substantially in parallel, for each selected job board.

Although process 1100 includes creation of a job posting after selection of job boards. Embodiments are not limited thereto. For example, the sequence of S1110 and S1120 may be reversed from that described above. Additionally, the job posting may have been created and stored at any time prior to selection of the job boards.

Figure 14:
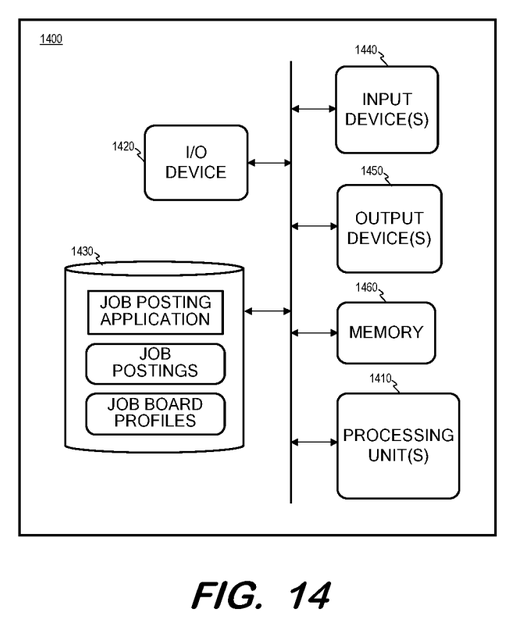
FIG. 14 is a block diagram of a hardware system for providing a job posting application according to some embodiments.

FIG. 14 is a block diagram of a hardware system for providing a job posting application according to some embodiments. Hardware system 1400 may comprise a computer server and may execute program code to perform any of the functions described herein. Hardware system 1400 may be implemented by a distributed cloud-based server, a virtual machine, or other implementation and may comprise an implementation of platform 110 in some embodiments. Hardware system 1400 may include other unshown elements according to some embodiments.

Hardware system 1400 includes processing unit(s) 1410 operatively coupled to I/O device 1420, data storage device 1430, one or more input devices 1440, one or more output devices 1450 and memory 1460. I/O device 1420 may facilitate communication with external devices, such as third-party posting platforms, an external network, the cloud, or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into hardware system 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, and RAM devices, while memory 1460 may comprise a RAM device.

Data storage device 1430 stores program code executed by processing unit(s) 1410 to cause system 1400 to implement any of the components and execute any one or more of the processes described herein. Such program code may include a network training program to execute training of neural networks based on datasets as described herein. Such execution may include definition of network hyperparameters, training datasets, loss functions, etc.

Embodiments are not limited to execution of these processes by a single computing device. Data storage device 1430 may also store data and other program code for providing additional functionality and/or which are necessary for operation of hardware system 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
receive a plurality of tags associated with a first job board and, for each of the plurality of tags, one or more values associated with the first job board;
input each of the plurality of tags to a first neural network to determine a field of a job posting system associated with the tag, wherein the first neural network is trained based on a plurality of mappings from fields of the job posting system to tags associated with a plurality of job boards;
input each of the one or more values of each of the plurality of tags to a second neural network to determine an item of the job posting system associated with the value, wherein the second neural network is trained based on a plurality of mappings from items of the job posting system to values associated with the plurality of job boards;
create first mappings from each of the plurality of tags associated with the first job board to the determined field associated with the tag;
create second mappings from each of the one or more values of each of the plurality of tags to the determined item associated with the value;
store the first mappings and the second mappings in association with the first job board;
receive a job posting comprising a plurality of fields and one or more items associated with each of the plurality of fields;
receive an instruction to transmit the job posting to the first job board; and
in response to the instruction:
for each of the plurality of fields, determine a tag associated with the first job board based on the first mappings;
for each of the one or more items, determine a value associated with the first job board based on the second mappings; and
transmit the determined tags and the determined values to the first job board for reception by the first job board and viewing by a candidate.

2. A system according to claim 1, the processing unit to execute the processor-executable program code to cause the system to:
receive a plurality of labels associated with the first job board and with each of a second plurality of values associated with the first job board;
input each of the plurality of labels to the second neural network to determine an item of the job posting system associated with the label, wherein the second neural network is trained based on a plurality of mappings from items of the job posting system to labels associated with the plurality of job boards;
create third mappings from each of the second plurality values to the determined item associated with the label which is associated with the value; and
store the third mappings in association with the first job board.

3. A system according to claim 1, the processing unit to execute the processor-executable program code to cause the system to:
re-train the first neural network based on the plurality of mappings from fields of the job posting system to tags associated with a plurality of job boards and on the first mappings; and
re-train the second neural network based on the plurality of mappings from items of the job posting system to values associated with the plurality of job boards and on the second mappings.

4. A system according to claim 1, the processing unit to execute the processor-executable program code to cause the system to:
receive a second plurality of tags associated with a second job board and, for each of the second plurality of tags, a second one or more values associated with the second job board;
input each of the second plurality of tags to the first neural network to determine a field of a job posting system associated with the tag;
input each of the second one or more values of each of the second plurality of tags to the second neural network to determine an item of the job posting system associated with the value;
create third mappings from each of the second plurality of tags associated with the second job board to the determined field associated with the tag;
create fourth mappings from each of the second one or more values of each of the second plurality of tags to the determined item associated with the value; and
store the third mappings and the fourth mappings in association with the second job board.

5. A system according to claim 4, the processing unit to execute the processor-executable program code to cause the system to:
receive an instruction to transmit the job posting to the first job board and to the second job board; and
in response to the instruction:
for each of the plurality of fields, determine a tag associated with the second job board based on the third mappings;
for each of the one or more items, determine a value associated with the second job board based on the fourth mappings;
transmit the determined tags associated with the second job board and the determined values associated with the second job board to the second job board for reception by the second job board and viewing by a second candidate.

6. A system according to claim 4, the processing unit to execute the processor-executable program code to cause the system to:
re-train the first neural network based on the plurality of mappings from fields of the job posting system to tags associated with a plurality of job boards, on the first mappings, and on the third mappings; and
re-train the second neural network based on the plurality of mappings from items of the job posting system to values associated with the plurality of job boards, on the second mappings, and on the fourth mappings.

7. A method comprising:
receiving a plurality of tags associated with a first job board and, for each of the plurality of tags, one or more values associated with the first job board;
determining a field of a job posting system associated with each of the plurality of tags using a first neural network, wherein the first neural network is trained based on a plurality of mappings from fields of the job posting system to tags associated with a plurality of job boards;

determining an item of the job posting system associated with each of the one or more values using a second neural network, wherein the second neural network is trained based on a plurality of mappings from items of the job posting system to values associated with the plurality of job boards;

creating first mappings from each of the plurality of tags associated with the first job board to the determined field associated with the tag;

creating second mappings from each of the one or more values of each of the plurality of tags to the determined item associated with the value;

storing the first mappings and the second mappings in association with the first job board;

receiving a job posting comprising a plurality of fields and one or more items associated with each of the plurality of fields;

receiving an instruction to transmit the job posting to the first job board; and in response to the instruction:
    for each of the plurality of fields, determining a tag associated with the first job board based on the first mappings;
    for each of the one or more items, determining a value associated with the first job board based on the second mappings; and
    transmitting the determined tags and the determined values to the first job board for reception by the first job board and viewing by a candidate.

8. A method according to claim 7, further comprising:
receiving a plurality of labels associated with the first job board and with each of a second plurality of values associated with the first job board;

determining an item of the job posting system associated with each of the plurality of labels using the second neural network, wherein the second neural network is trained based on a plurality of mappings from items of the job posting system to labels associated with the plurality of job boards;

creating third mappings from each of the second plurality values to the determined item associated with the label which is associated with the value; and storing the third mappings in association with the first job board.

9. A method according to claim 7, further comprising:
re-training the first neural network based on the plurality of mappings from fields of the job posting system to tags associated with a plurality of job boards and on the first mappings; and re-training the second neural network based on the plurality of mappings from items of the job posting system to values associated with the plurality of job boards and on the second mappings.

10. A method according to claim 7, further comprising:
receiving a second plurality of tags associated with a second job board and, for each of the second plurality of tags, a second one or more values associated with the second job board;

determining a field of a job posting system associated with each of the second plurality of tags using the first neural network;

determining an item of the job posting system associated with each of the second one or more values using the second neural network;

creating third mappings from each of the second plurality of tags associated with the second job board to the determined field associated with the tag;

creating fourth mappings from each of the second one or more values of each of the second plurality of tags to the determined item associated with the value; and storing the third mappings and the fourth mappings in association with the second job board.

11. A method according to claim 10, further comprising:
receiving a job posting comprising a plurality of fields and one or more items associated with each of the plurality of fields;

receiving an instruction to transmit the job posting to the first job board and to the second job board; and in response to the instruction:
    for each of the plurality of fields, determining a tag associated with the second job board based on the third mappings;
    for each of the one or more items, determining a value associated with the second job board based on the fourth mappings;
    transmitting the determined tags associated with the second job board and the determined values associated with the second job board to the second job board for reception by the second job board and viewing by a second candidate.

12. A method according to claim 10, further comprising:
re-training the first neural network based on the plurality of mappings from fields of the job posting system to tags associated with a plurality of job boards, on the first mappings, and on the third mappings; and re-training the second neural network based on the plurality of mappings from items of the job posting system to values associated with the plurality of job boards, on the second mappings, and on the fourth mappings.

13. A non-transitory computer-readable medium storing program code executable by a processing unit to:
receive a plurality of tags associated with a first job board and, for each of the plurality of tags, one or more values associated with the first job board;

input each of the plurality of tags to a first neural network to determine a field of a job posting system associated with the tag, wherein the first neural network is trained based on a plurality of mappings from fields of the job posting system to tags associated with a plurality of job boards;

input each of the one or more values of each of the plurality of tags to a second neural network to determine an item of the job posting system associated with the value, wherein the second neural network is trained based on a plurality of mappings from items of the job posting system to values associated with the plurality of job boards;

create first mappings from each of the plurality of tags associated with the first job board to the determined field associated with the tag;

create second mappings from each of the one or more values of each of the plurality of tags to the determined item associated with the value; and store the first mappings and the second mappings in association with the first job board;

receive a job posting comprising a plurality of fields and one or more items associated with each of the plurality of fields;

receive an instruction to transmit the job posting to the first job board; and in response to the instruction:
for each of the plurality of fields, determine a tag associated with the first job board based on the first mappings;
for each of the one or more items, determine a value associated with the first job board based on the second mappings; and
transmit the determined tags and the determined values to the first job board for reception by the first job board and viewing by a candidate.

14. A medium according to claim 13, the program code executable by a processing unit to:
receive a plurality of labels associated with the first job board and with each of a second plurality of values associated with the first job board;
input each of the plurality of labels to the second neural network to determine an item of the job posting system associated with the label, wherein the second neural network is trained based on a plurality of mappings from items of the job posting system to labels associated with the plurality of job boards;
create third mappings from each of the second plurality values to the determined item associated with the label which is associated with the value; and
store the third mappings in association with the first job board.

15. A medium according to claim 13, the program code executable by a processing unit to:
re-train the first neural network based on the plurality of mappings from fields of the job posting system to tags associated with a plurality of job boards and on the first mappings; and
re-train the second neural network based on the plurality of mappings from items of the job posting system to values associated with the plurality of job boards and on the second mappings.

16. A medium according to claim 13, the program code executable by a processing unit to:

receive a second plurality of tags associated with a second job board and, for each of the second plurality of tags, a second one or more values associated with the second job board;
input each of the second plurality of tags to the first neural network to determine a field of a job posting system associated with the tag;
input each of the second one or more values of each of the second plurality of tags to the second neural network to determine an item of the job posting system associated with the value;
create third mappings from each of the second plurality of tags associated with the second job board to the determined field associated with the tag;
create fourth mappings from each of the second one or more values of each of the second plurality of tags to the determined item associated with the value; and
store the third mappings and the fourth mappings in association with the second job board.

17. A medium according to claim 16, the program code executable by a processing unit to:
receive a job posting comprising a plurality of fields and one or more items associated with each of the plurality of fields;
receive an instruction to transmit the job posting to the second job board; and
in response to the instruction:
for each of the plurality of fields, determine a tag associated with the second job board based on the third mappings;
for each of the one or more items, determine a value associated with the second job board based on the fourth mappings; and
transmit the determined tags associated with the second job board and the determined values associated with the second job board to the second job board for reception by the second job board and viewing by a second candidate.

* * * * *